UNITED STATES PATENT OFFICE 2,347,242

N-(AMINO-BENZENE-SULPHONYL)-NITROSO-ANILINES AND SALTS THEREOF, AND METHOD OF PREPARING THEM

William Braker, Brooklyn, N. Y., and William A. Lott, Westfield, N. J., assignors to E. R. Squibb & Sons, New York, N. Y., a corporation of New York No Drawing. Application January 2, 1941, Serial No. 372,830

6 Claims. (Cl. 260—397.7)

This invention relates to, and has for its object the provision of, N-(amino-benzene-sulphonyl)-nitroso-anilines, salts thereof, and a method of preparing these compounds.

The invention comprises especially compounds of the general formula

$$R(R')N-C_6H_4-SO_2-NH-C_6H_4-NO$$

wherein R represents hydrogen or lower alkyl, and R' represents hydrogen, lower alkyl, or acyl; and salts thereof: these compounds—notably 4'-nitroso-4-amino-benzene-sulphonanilide and salts thereof—are valuable chemotherapeutic agents, being effective in the treatment of certain infectious diseases.

The compounds of this invention may be prepared by reacting an amino-benzene-sulphonyl halide (the amino group thereof being protected, e. g. acetylated) with a nitroso aniline in a suitable inert solvent. Preferably, however, the compounds of this invention are prepared from N-(acylamino-benzene-sulphonyl)-nitro-anilines by reducing them to the corresponding β-hydroxylamines (e. g. by means of nascent hydrogen), and oxidizing the intermediate hydroxylamine to the corresponding nitroso compound (e. g. by means of ferric chloride or bichromate solution). Desirably, this indirect reduction is effected without isolating the intermediate hydroxylamine. The resulting N-(acylamino-benzene-sulphonyl)-nitroso-anilines may, if desired, be converted into the corresponding unacylated compounds by hydrolysis, for example with sodium hydroxide.

The N-(amino-benzene-sulphonyl)-nitroso-anilines are amphoteric compounds, and readily form water-soluble acid-addition salts with hydrochloric, sulphuric, boric, nitric, lactic, tartaric, and other acids commonly used to solubilize amine-bases, as well as salts with bases, for example NaOH, KOH, and organic bases.

The following example is illustrative of the invention: 50 g. 4'-nitro-4-acetamino-benzene-sulphonanilide is suspended in a mixture of 500 cc. 95% ethanol and 100 cc. acetic acid, and 50 g. zinc dust is added thereto over a half hour while vigorously stirring the reaction mixture and maintaining its temperature below 50° C. After stirring an additional ¼ hour or so, the reaction mixture is poured into a well-stirred solution of 500 cc. saturated potassium dichromate and 20 cc. concentrated sulphuric acid in 480 cc. water. Stirring is continued for an additional half hour, the reaction mixture is poured into 3 liters of water, and the insoluble material is filtered out, washed with water and vacuum-dried. 4'-nitroso-4-acetamino-benzene-sulphonanilide (softening at 198–200° C. and melting at 210–212° C.), thus obtained in a yield of 62%, may be further purified by conventional means, but desirably is hydrolyzed without further purification.

19.0 g. of the 4'-nitroso-4-acetamino-benzene-sulphonanilide is dissolved in 500 cc. of a 10% sodium hydroxide solution, and refluxed for 2½ hours. Then 200 cc. water is added, and the solution neutralized with acetic acid and filtered hot. The material which crystallizes from the filtrate on cooling is filtered, washed with water, and vacuum-dried. The 4'-nitroso-4-amino-benzene-sulphonanilide thus obtained is a light-brown crystalline material melting at 132–133° C., and, after one crystallization from water, at 133–134° C.

The 4'-nitroso-4-amino-benzene-sulphonanilide may be converted into a water-soluble, acid-addition salt with hydrochloric acid, for example, by dissolving it in absolute alcohol, adding one mole of dry hydrochloric acid, and precipitating the salt by adding ether (or by evaporating the alcoholic solution to dryness). An aqueous solution of the hydrochloride may be prepared without isolating the hydrochloride by adding the 4'-nitroso-4-amino-benzene-sulphonanilide to a dilute aqueous solution of hydrochloric acid.

The sodium salt of the 4'-nitroso-4-amino-benzene-sulphonanilide may be prepared by suspending the compound in boiling alcohol, and adding a moderate excess of alcoholic sodium hydroxide. After cooling, adding ether to the point of incipient precipitation, and storing overnight in the refrigerator, the sodium salt of 4'-nitroso-4-amino-benzene-sulphonanilide separates.

The 4'-nitro-4-acetamino-benzene-sulphonanilide reactant can be prepared by the condensation of acetyl-sulphanilyl chloride with p-nitro-aniline, as described by Bauer, J. A. C. S. 61, 613 (1939); and obviously other N-(acylamino-benzene-sulphonyl)-nitro-aniline reactants can be prepared by the same method, using the appropriate acylamino-benzene-sulphonyl chloride and nitro-aniline; inter alia, m-acylamino-benzene-sulphonyl chlorides, o-acylamino-benzene-sulphonyl chlorides, acylated p-methyl-amino-benzene sulphonyl chlorides, o-nitro-aniline, and m-nitro-aniline.

The compounds of this invention may be tautomeric; for example, the compound identified hereinabove as 4'-nitroso-4-amino-benzene-sulphonanilide may react as if it had the structure

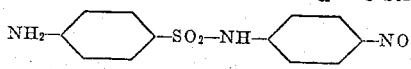

or

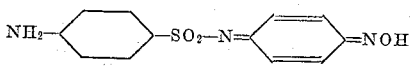

or may consist of a mixture of these isomers in dynamic equilibrium; and, without explicit reference thereto, these tautomeric forms and mixtures are to be regarded as embraced by the appended claims.

The invention may be variously otherwise embodied, within the scope of the appended claims.

We claim:

1. A compound of the group consisting of N-(amino-benzene-sulphonyl)-nitroso-anilines and salts thereof.

2. 4'-nitroso-4-amino-benzene-sulphonanilide.

3. 4'-nitroso-4-acetamino-benzene-sulphonanilide.

4. A salt of 4'-nitroso-4-amino-benzene-sulphonanilide.

5. The method of preparing a N-(amino-benzene-sulphonyl)-nitroso-aniline which comprises reducing a N-(acylamino-benzene-sulphonyl)-nitro-aniline to the corresponding β-hydroxylamine, and oxidizing thhe hydroxylamine to the corresponding nitroso compound.

6. The method of preparing 4'-nitroso-4-amino-benzene-sulphonanilide which comprises reducing 4'-nitro-4-acetamino-benzene-sulphonanilide to the corresponding β-hydroxylamine, oxidizing the hydroxylamine to the corresponding nitroso compound, and converting that nitroso compound into 4'-nitroso-4-amino-benzene-sulphonanilide by hydrolysis.

WILLIAM BRAKER.
WILLIAM A. LOTT.